(12) United States Patent
Lowe

(10) Patent No.: US 11,829,826 B2
(45) Date of Patent: *Nov. 28, 2023

(54) RFID DEVICE

(71) Applicant: CompoSecure, LLC, Somerset, NJ (US)

(72) Inventor: Adam Lowe, Somerset, NJ (US)

(73) Assignee: CompoSecure, LLC, Somerset, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/861,485

(22) Filed: Jul. 11, 2022

(65) Prior Publication Data

US 2022/0343129 A1    Oct. 27, 2022

Related U.S. Application Data

(63) Continuation of application No. 17/128,427, filed on Dec. 21, 2020, now Pat. No. 11,461,608, which is a continuation of application No. 16/427,864, filed on May 31, 2019, now Pat. No. 10,977,540, which is a continuation-in-part of application No. 16/320,597, filed as application No. PCT/US2017/043954 on Jul. 26, 2017, now Pat. No. 11,267,172, said application No. 16/427,864 is a continuation-in-part of application No. 16/164,322, filed on Oct. 18, 2018, now Pat. No. 10,406,734, which is a continuation-in-part of application No. PCT/US2017/043954, filed on Jul. 26, 2017.

(60) Provisional application No. 62/367,362, filed on Jul. 27, 2016.

(51) Int. Cl.
   *G06K 19/077*    (2006.01)

(52) U.S. Cl.
   CPC ... *G06K 19/0772* (2013.01); *G06K 19/07718* (2013.01)

(58) Field of Classification Search
   CPC ........ G06K 19/00; G06K 19/04; G06K 19/06; G06K 19/07; G06K 19/067
   USPC .......................... 235/380, 492, 488, 487, 375
   See application file for complete search history.

(56) References Cited

U.S. PATENT DOCUMENTS

| | | |
|---|---|---|
| 3,802,101 A | 4/1974 | Scantlin |
| 4,737,620 A | 4/1988 | Mollet et al. |
| 5,013,900 A | 5/1991 | Hoppe |
| 5,350,553 A | 9/1994 | Gläser et al. |

(Continued)

FOREIGN PATENT DOCUMENTS

| | | |
|---|---|---|
| BE | 1010587 A6 | 11/1998 |
| CA | 2347818 A1 | 5/2000 |

(Continued)

OTHER PUBLICATIONS

Japanese Notice of Reasons for Rejection for Japanese Application No. 2021-003355, dated Oct. 11, 2022 with translation, 7 pages.

(Continued)

*Primary Examiner* — Edwyn Labaze
(74) *Attorney, Agent, or Firm* — RatnerPrestia

(57) ABSTRACT

A process for manufacturing a transaction card includes forming an opening in a card body of the transaction card; inserting an electronic component into the opening; and disposing a non-conductive material about the electronic component. A transaction card includes a molded electronic component.

29 Claims, 8 Drawing Sheets

(56) References Cited

U.S. PATENT DOCUMENTS

| | | | |
|---|---|---|---|
| 5,463,953 A | 11/1995 | Kaspers et al. | |
| 5,574,309 A | 11/1996 | Papapietro et al. | |
| 5,598,032 A | 1/1997 | Fidalgo | |
| 5,681,356 A | 10/1997 | Barak et al. | |
| 5,774,339 A | 6/1998 | Ohbuchi et al. | |
| 5,935,497 A | 8/1999 | Rose | |
| 5,962,840 A | 10/1999 | Haghiri-Tehrani et al. | |
| 6,065,681 A | 5/2000 | Trueggelmann | |
| 6,188,580 B1 | 2/2001 | Huber et al. | |
| 6,190,942 B1 | 2/2001 | Wilm et al. | |
| 6,724,103 B2 | 4/2004 | Parrault | |
| 6,817,532 B2 | 11/2004 | Finkelstein | |
| D529,955 S | 10/2006 | Allard et al. | |
| 7,237,724 B2 | 7/2007 | Singleton | |
| 7,701,350 B2 | 4/2010 | Sakama et al. | |
| 7,762,470 B2 | 7/2010 | Finn et al. | |
| 7,823,777 B2 | 11/2010 | Varga et al. | |
| 7,936,273 B2 | 5/2011 | Kobayashi et al. | |
| 7,954,228 B2 | 6/2011 | Kobayashi et al. | |
| 8,128,000 B2 | 3/2012 | Forster | |
| 8,141,786 B2 | 3/2012 | Bhandarkar et al. | |
| 8,174,454 B2 | 5/2012 | Mayer | |
| 8,226,013 B2 | 7/2012 | Phillips et al. | |
| 8,248,240 B2 | 8/2012 | Osaki et al. | |
| 8,261,997 B2 | 9/2012 | Gebhart | |
| 8,448,872 B2 | 5/2013 | Droz | |
| 8,519,905 B2 | 8/2013 | Tanaka et al. | |
| 8,608,082 B2 | 12/2013 | Le Garrec et al. | |
| 8,622,311 B2 | 1/2014 | Hamedani et al. | |
| 8,698,633 B2 | 4/2014 | Kobayashi et al. | |
| 8,725,589 B1 | 5/2014 | Skelding et al. | |
| 8,786,510 B2 | 7/2014 | Coleman et al. | |
| 8,789,762 B2 | 7/2014 | Finn et al. | |
| 8,978,987 B2 | 3/2015 | Scarlatella | |
| 9,000,619 B2 | 4/2015 | Kato et al. | |
| 9,058,547 B2 | 6/2015 | Oh et al. | |
| 9,099,789 B1 | 8/2015 | Modro | |
| 9,251,458 B2 | 2/2016 | Finn et al. | |
| 9,320,186 B2 | 4/2016 | Droz | |
| 9,390,363 B1 | 7/2016 | Herslow et al. | |
| 9,390,364 B2 | 7/2016 | Finn et al. | |
| 9,390,366 B1 | 7/2016 | Herslow et al. | |
| 9,475,086 B2 | 10/2016 | Finn et al. | |
| 9,489,613 B2 | 11/2016 | Finn et al. | |
| 9,576,238 B2 | 2/2017 | Yosui | |
| 9,622,359 B2 | 4/2017 | Finn et al. | |
| 9,634,391 B2 | 4/2017 | Finn et al. | |
| 9,697,459 B2 | 7/2017 | Finn et al. | |
| 9,721,200 B2 | 8/2017 | Herslow et al. | |
| D797,188 S | 9/2017 | Hendrick | |
| 9,760,816 B1 | 9/2017 | Williams et al. | |
| 9,798,968 B2 | 10/2017 | Finn et al. | |
| 9,812,782 B2 | 11/2017 | Finn et al. | |
| 9,836,684 B2 | 12/2017 | Finn et al. | |
| 9,898,699 B2 | 2/2018 | Herslow et al. | |
| D812,137 S | 3/2018 | Daniel et al. | |
| 9,941,572 B2 | 4/2018 | Liu et al. | |
| 10,032,099 B2 | 7/2018 | Mosteller | |
| 10,089,570 B2 | 10/2018 | Herslow et al. | |
| 10,140,569 B2 | 11/2018 | Kang et al. | |
| 10,147,999 B2 | 12/2018 | Wang et al. | |
| 10,193,211 B2 | 1/2019 | Finn et al. | |
| 10,339,434 B2 | 7/2019 | Cox | |
| 10,406,734 B2 | 9/2019 | Lowe | |
| 10,445,627 B1 | 10/2019 | Sexl et al. | |
| 10,583,683 B1 | 3/2020 | Ridenour et al. | |
| 10,762,412 B2 | 9/2020 | Lowe et al. | |
| 10,977,540 B2 | 4/2021 | Lowe et al. | |
| 11,267,172 B2 | 3/2022 | Lowe et al. | |
| 2002/0190132 A1 | 12/2002 | Kayanakis | |
| 2003/0038174 A1 | 2/2003 | Jones | |
| 2003/0046555 A1 | 3/2003 | Bradley et al. | |
| 2003/0102541 A1 | 6/2003 | Gore et al. | |
| 2004/0129450 A1 | 7/2004 | Yamazaki et al. | |
| 2005/0045729 A1 | 3/2005 | Yamazaki | |
| 2005/0087609 A1 | 4/2005 | Martin | |
| 2006/0102729 A1 | 5/2006 | Gandel et al. | |
| 2006/0219776 A1 | 10/2006 | Finn | |
| 2006/0226240 A1 | 10/2006 | Singleton | |
| 2007/0034700 A1 | 2/2007 | Poidomani et al. | |
| 2007/0075132 A1 | 4/2007 | Kean | |
| 2007/0075312 A1 | 4/2007 | Chin et al. | |
| 2007/0080360 A1* | 4/2007 | Mirsky | H01L 23/3677 257/706 |
| 2007/0290048 A1 | 12/2007 | Singleton et al. | |
| 2008/0001759 A1 | 1/2008 | Kobayashi et al. | |
| 2011/0024036 A1 | 2/2011 | Benato | |
| 2011/0031311 A1 | 2/2011 | Bakker | |
| 2011/0031319 A1 | 2/2011 | Kiekhaefer et al. | |
| 2011/0315779 A1 | 12/2011 | Bidin et al. | |
| 2012/0044693 A1 | 2/2012 | Hatase et al. | |
| 2012/0201994 A1 | 8/2012 | Michalk | |
| 2012/0206869 A1 | 8/2012 | Droz | |
| 2013/0062875 A1 | 3/2013 | Le Loarer et al. | |
| 2013/0102113 A1 | 4/2013 | Yang | |
| 2013/0228628 A1 | 9/2013 | Bona et al. | |
| 2013/0247432 A1 | 9/2013 | Droz | |
| 2013/0255078 A1 | 10/2013 | Cox | |
| 2013/0255079 A1 | 10/2013 | Maijala et al. | |
| 2013/0299593 A1 | 11/2013 | Glidden | |
| 2014/0158773 A1 | 6/2014 | Blum | |
| 2014/0279555 A1 | 9/2014 | Guillaud | |
| 2014/0283978 A1 | 9/2014 | Droz | |
| 2014/0353384 A1 | 12/2014 | Hoegerl et al. | |
| 2014/0361086 A1 | 12/2014 | Finn et al. | |
| 2015/0021403 A1 | 1/2015 | Finn et al. | |
| 2015/0097040 A1 | 4/2015 | Rampetreiter et al. | |
| 2015/0129665 A1 | 5/2015 | Finn et al. | |
| 2015/0136858 A1 | 5/2015 | Finn et al. | |
| 2015/0180229 A1 | 6/2015 | Herslow | |
| 2015/0206047 A1 | 7/2015 | Herslow et al. | |
| 2015/0235063 A1 | 8/2015 | Loussert | |
| 2015/0235122 A1 | 8/2015 | Finn et al. | |
| 2015/0239202 A1 | 8/2015 | Purdy et al. | |
| 2015/0269471 A1 | 9/2015 | Finn et al. | |
| 2015/0269474 A1 | 9/2015 | Finn et al. | |
| 2015/0269477 A1 | 9/2015 | Finn et al. | |
| 2015/0278675 A1 | 10/2015 | Finn et al. | |
| 2015/0339564 A1 | 11/2015 | Herslow et al. | |
| 2016/0110639 A1 | 4/2016 | Finn et al. | |
| 2016/0180212 A1 | 6/2016 | Herslow et al. | |
| 2016/0203399 A1 | 7/2016 | Cox | |
| 2016/0229081 A1 | 8/2016 | Williams et al. | |
| 2016/0365644 A1 | 12/2016 | Finn et al. | |
| 2017/0017871 A1 | 1/2017 | Finn et al. | |
| 2017/0077589 A1 | 3/2017 | Finn et al. | |
| 2017/0106572 A1 | 4/2017 | Cepress et al. | |
| 2017/0243099 A1 | 8/2017 | Kluge | |
| 2017/0243104 A1 | 8/2017 | Cox | |
| 2017/0262749 A1 | 9/2017 | Cox | |
| 2017/0270398 A1 | 9/2017 | Mathieu et al. | |
| 2017/0308785 A1 | 10/2017 | Kim et al. | |
| 2017/0316300 A1 | 11/2017 | Herslow et al. | |
| 2017/0316303 A1 | 11/2017 | Pachler et al. | |
| 2017/0323193 A1 | 11/2017 | Kitney et al. | |
| 2018/0068212 A1 | 3/2018 | Williams et al. | |
| 2018/0123221 A1 | 5/2018 | Finn et al. | |
| 2018/0157954 A1 | 6/2018 | Herslow et al. | |
| 2018/0204105 A1 | 7/2018 | Herslow et al. | |
| 2018/0307962 A1 | 10/2018 | Lowe et al. | |
| 2018/0339503 A1 | 11/2018 | Finn et al. | |
| 2018/0341846 A1 | 11/2018 | Finn et al. | |
| 2018/0341847 A1 | 11/2018 | Finn et al. | |
| 2018/0349751 A1 | 12/2018 | Herslow et al. | |
| 2019/0050706 A1 | 2/2019 | Lowe | |
| 2019/0114526 A1 | 4/2019 | Finn et al. | |
| 2019/0130242 A1 | 5/2019 | Fu et al. | |
| 2019/0156073 A1 | 5/2019 | Finn et al. | |
| 2019/0156994 A1 | 5/2019 | Cox | |
| 2019/0197381 A1 | 6/2019 | Cox | |
| 2019/0204812 A1 | 7/2019 | Cox | |
| 2019/0206161 A1 | 7/2019 | Cox | |
| 2019/0236434 A1 | 8/2019 | Lowe | |

(56) References Cited

U.S. PATENT DOCUMENTS

| | | |
|---|---|---|
| 2019/0240886 A1 | 8/2019 | van Peer et al. |
| 2019/0279065 A1 | 9/2019 | Cox |
| 2019/0300695 A1 | 10/2019 | Cox |

FOREIGN PATENT DOCUMENTS

| | | |
|---|---|---|
| CA | 2860909 A1 | 8/2013 |
| CN | 100397406 C | 6/2008 |
| CN | 101281618 A | 10/2008 |
| CN | 101375647 A | 2/2009 |
| CN | 103153640 A | 6/2013 |
| CN | 205263500 U | 5/2016 |
| CN | 106599977 A | 12/2016 |
| DE | 19703122 C1 | 5/1998 |
| DE | 19848193 C1 | 11/1999 |
| DE | 19934434 A1 | 2/2001 |
| DE | 10132893 A1 | 1/2003 |
| DE | 102007016777 A1 | 10/2008 |
| DE | 102008053582 B3 | 4/2010 |
| EP | 0277854 A1 | 8/1988 |
| EP | 0426406 A2 | 5/1991 |
| EP | 2133828 A2 | 12/2009 |
| EP | 2722193 A1 | 4/2014 |
| EP | 2765648 A1 | 8/2014 |
| EP | 3009964 A1 | 4/2016 |
| JP | 54116043 U | 8/1979 |
| JP | 59228743 A | 12/1984 |
| JP | 61222715 A | 10/1986 |
| JP | 63072596 A | 4/1988 |
| JP | 6399995 A | 5/1988 |
| JP | 63185688 A | 8/1988 |
| JP | 63239097 A | 10/1988 |
| JP | 021397 A | 1/1990 |
| JP | 02055198 A | 2/1990 |
| JP | 03205197 A | 9/1991 |
| JP | 0564861 A | 3/1993 |
| JP | 07501758 A | 2/1995 |
| JP | 08276459 A | 10/1996 |
| JP | 09315053 A | 12/1997 |
| JP | 10291392 A | 11/1998 |
| JP | 1111056 A | 1/1999 |
| JP | 2001505682 A | 4/2001 |
| JP | 2001155275 A | 6/2001 |
| JP | 2003234615 A | 8/2003 |
| JP | 2004094561 A | 3/2004 |
| JP | 2005251176 A | 9/2005 |
| JP | 2007021830 A | 2/2007 |
| JP | 2008538430 A | 10/2008 |
| JP | 2012067467 A | 4/2012 |
| JP | 2013162195 A | 8/2013 |
| JP | 2017508333 A | 3/2017 |
| JP | 7104784 B2 | 7/2022 |
| KR | 20010080890 A | 8/2001 |
| KR | 20140117614 A | 10/2014 |
| KR | 20170061572 A | 4/2016 |
| KR | 20170120524 A | 10/2017 |
| TW | 504647 B | 10/2002 |
| TW | 201723933 A | 7/2017 |
| TW | 201808635 A | 3/2018 |
| WO | 9809252 A1 | 3/1998 |
| WO | 2006017968 A1 | 10/2006 |
| WO | 2008105582 A1 | 9/2008 |
| WO | 2013110625 A1 | 8/2013 |
| WO | 2013115148 A1 | 8/2013 |
| WO | 2015071017 A1 | 5/2015 |
| WO | 2015071086 A1 | 5/2015 |
| WO | 2015144261 A1 | 10/2015 |
| WO | 2016020067 A1 | 2/2016 |
| WO | 2016046184 A1 | 3/2016 |
| WO | 2016073473 A1 | 5/2016 |
| WO | 2017007468 A1 | 1/2017 |
| WO | 2017090891 A1 | 6/2017 |
| WO | 2017177906 A1 | 10/2017 |
| WO | 2018022755 A1 | 2/2018 |
| WO | 2018132404 A1 | 7/2018 |
| WO | 2018138432 A1 | 8/2018 |
| WO | 2018202774 A | 11/2018 |
| WO | 2019079007 A1 | 4/2019 |
| WO | 2020055987 A1 | 3/2020 |

OTHER PUBLICATIONS

Chinese Office Action for Chinese Application No. 201880080975.6, dated Dec. 22, 2022 with translation, 19 pages.

Entire patent prosecution history of U.S. Appl. No. 15/928,813, filed Mar. 22, 2018, entitled, "DI Capacitive Embedded Metal Card."

Entire patent prosecution history of U.S. Appl. No. 16/164,322, filed Oct. 18, 2018, entitled, "Overmolded Electronic Components for Transaction Cards and Methods of Making Thereof."

Entire patent prosecution history of U.S. Appl. No. 16/320,597, filed Jan. 25, 2019, entitled, "Overmolded Electronic Components for Transaction Cards and Methods of Making Thereof."

Entire patent prosecution history of U.S. Appl. No. 16/427,864, filed May 31, 2019, entitled, "RFID Device."

Entire patent prosecution history of U.S. Appl. No. 17/128,427, filed Dec. 21, 2020, entitled, "RFID Device."

Non Final Office Action for U.S. Appl. No. 17/168,382, dated Oct. 17, 2022, 66 pages.

Australian Examination Report for Australian Application No. 2019213838, dated Jun. 29, 2021, 8 pages.

Canadian Examination Report for Canadian Application No. 3,088,900, dated Apr. 8, 2021, 6 pages.

Chen et al., "A Metallic RFID Tag Design for Steel-Bar and Wire-Rod Management Application in the Steel Industry", Progress in Electromagnetics Research, PIER 91, 2009, pp. 195-212.

Chinese Office Action for Chinese Application No. 201780046491.5, dated Jul. 5, 2021, with translation, 16 pages.

European Communication Pursuant to Article 94(3) for European Application No. 17835207.6, dated Oct. 23, 2020, 6 pages.

Extended European Search Report for European Application No. 17835207.6, dated Mar. 10, 2020, 12 pages.

Final Office Action for U.S. Appl. No. 16/124,711, dated Aug. 7, 2020, 18 pages.

Final Office Action for U.S. Appl. No. 16/164,322, dated Apr. 11, 2019, 20 pages.

Final Office Action for U.S. Appl. No. 17/128,427, dated Oct. 5, 2021, 16 pages.

Indian Examination Report for Indian Application No. 202017013311, dated Jul. 8, 2021, with translation, 6 pages.

Indian Examination Report for Indian Application No. 202017017173, dated Mar. 11, 2022 with translation, 7 pages.

Indian Examination Report for Indian Application No. 202017030442, dated Jun. 2, 2022 with translation, 7 pages.

International Preliminary Report on Patentability for International Application No. PCT/US2017/043954, dated Jan. 29, 2019, 6 pages.

International Preliminary Report on Patentability for International Application No. PCT/US2018/049899, dated Mar. 10, 2020, 8 pages.

International Preliminary Report on Patentability for International Application No. PCT/US2018/052832, dated Apr. 21, 2020, 9 pages.

International Preliminary Report on Patentability for International Application No. PCT/US2019/056704, dated Apr. 14, 2021, 7 pages.

International Search Report and Written Opinion for International Application No. PCT/US2017/043954, dated Oct. 5, 2017, 6 pages.

International Search Report and Written Opinion for International Application No. PCT/US2019/014656, dated Apr. 1, 2019, 16 pages.

International Search Report and Written Opinion for International Application No. PCT/US2019/056704, dated Dec. 18, 2019, 11 pages.

International Search Report and Written Opinion for International Application No. PCT/US2020/034661, dated Sep. 1, 2020, 16 pages.

(56) References Cited

OTHER PUBLICATIONS

International Search Report and Written Opinion for International Application No. PCT/US2021/013796, dated May 11, 2021, 13 pages.
Japanese Decision of Final Rejection for Japanese Application No. 2019-504037, dated Oct. 6, 2020, with translation, 5 pages.
Japanese Notice of Reasons for Refusal for Japanese Application No. 2021-521110, dated Apr. 26, 2022 with translation, 11 pages.
Japanese Notice of Reasons for Rejection for Japanese Application No. 2019-504037, dated Mar. 10, 2020 with translation, 7 pages.
Japanese Notice of Reasons for Rejection for Japanese Application No. 2020-522026, dated May 25, 2021 with translation, 8 pages.
Japanese Notice of Reasons for Rejection for Japanese Application No. 2020-541522, dated May 31, 2021 with translation, 7 pages.
Japanese Notice of Termination of Pretrial Reexamination for Japanese Application No. 2019-504037, dated May 18, 2021, with translation, 2 pages. 2021.
Japanese Report of Pretrial Reexamination of Japanese Application No. 2019-504037, dated May 12, 2021, with translation, 5 pages.
Korean Office Action for Korean Application No. 10-2019-7005614, dated Apr. 17, 2020, with translation, 14 pages.
Non Final Office Action for U.S. Appl. No. 15/928,813, dated Apr. 15, 2020, 51 pages.
Non Final Office Action for U.S. Appl. No. 16/124,711, dated May 1, 2020, 31 pages.
Non Final Office Action for U.S. Appl. No. 16/320,597, dated Apr. 13, 2021, 74 pages.
Non Final Office Action for U.S. Appl. No. 16/427,864, dated Nov. 4, 2020, 56 pages.
Non Final Office Action for U.S. Appl. No. 16/441,363, dated Aug. 8, 2019, 23 pages.
Non Final Office Action for U.S. Appl. No. 16/751,285, dated Jan. 25, 2021, 51 pages.
Non Final Office Action for U.S. Appl. No. 16/783,504, dated Oct. 15, 2020, 38 pages.
Non Final Office Action for U.S. Appl. No. 17/101,092, dated Feb. 17, 2022, 26 pages.
Non Final Office Action for U.S. Appl. No. 17/101,092, dated Sep. 16, 2021, 54 pages.
Non Final Office Action for U.S. Appl. No. 17/101,096, dated Oct. 15, 2021, 59 pages.
Non Final Office Action for U.S. Appl. No. 17/128,427, dated Dec. 15, 2021, 20 pages.
Non Final Office Action for U.S. Appl. No. 17/128,427, dated Jun. 29, 2021, 53 pages.
Non Final Office Action for U.S. Appl. No. 29/663,230, dated Jul. 25, 2019, 19 pages.
Notice of Allowance for Application No. 16/783/504, dated Nov. 13, 2020, 12 pages.
Singapore Written Opinion for Application No. 11202003431Y, dated Apr. 22, 2021, 7 pages.
Taiwanese Office Action for Taiwanese Application No. 109117975, dated Sep. 24, 2021, with translation, 22 pages.
Taiwanese Office Action for Taiwanese Application No. 110102065, dated Dec. 1, 2021, with Search Report, 6 pages.
Taiwanese Office Action for Taiwanese Application No. 110103206, dated Jan. 27, 2022 with translation, 40 pages.
Third Party Submission Under 37 CFR 1.290, filed in U.S. Appl. No. 15/928,813, Concise Description of Relevance, dated Nov. 11, 2019, 8 pages.
Third Party Submission Under 37 CFR 1.290, filed in U.S. Appl. No. 15/928,813, Concise Description of Relevance, dated Oct. 15, 2019, 13 pages.
Third Party Submission Under 37 CFR 1.290, filed in U.S. Appl. No. 15/928,813, Concise Description of Relevance, dated Oct. 27, 2019, 13 pages.
Chinese Office Action for Chinese Application No. 201880065325.4, dated Mar. 8, 2023 with translation, 35 pages.
Japanese Notice of Reasons for Rejection for Japanese Application No. 2022-110485, dated May 9, 2023 with translation, 15 pages.
Japanese Notice of Reasons for Rejection for Japanese Application No. 2021-570892, dated May 9, 2023 with translation, 18 pages.

* cited by examiner

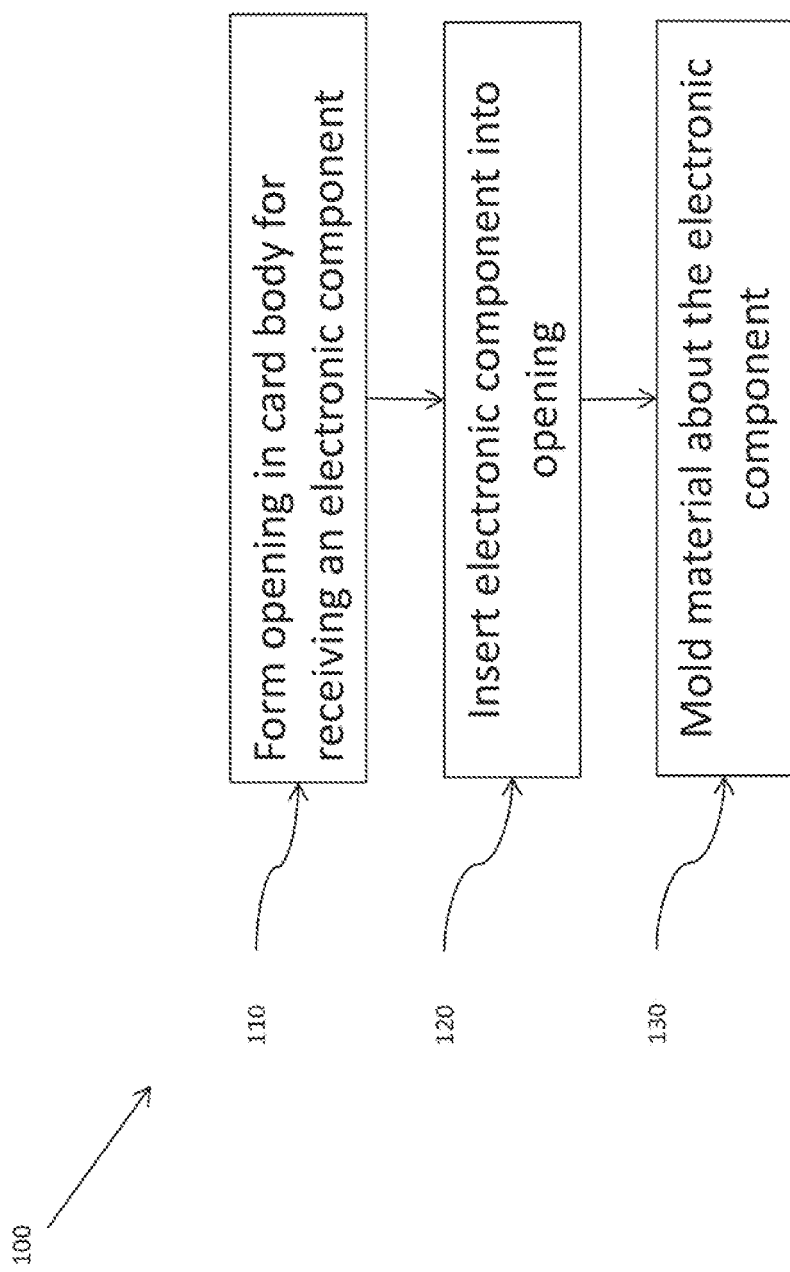

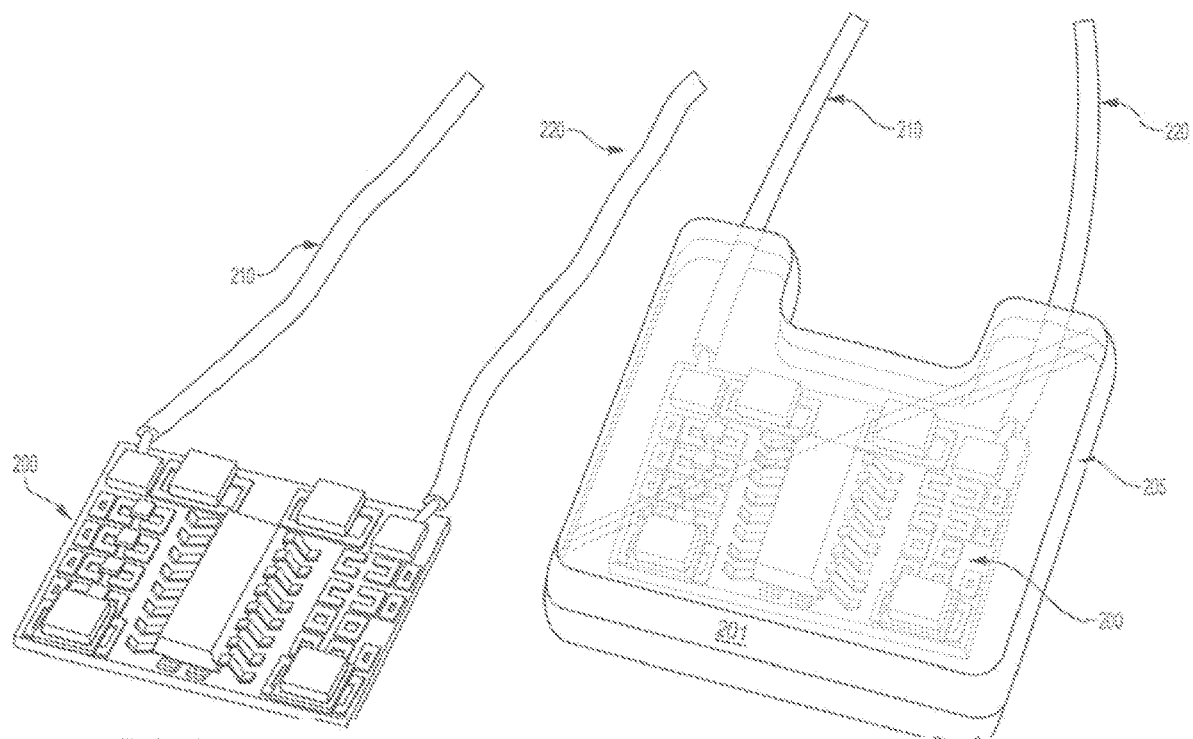

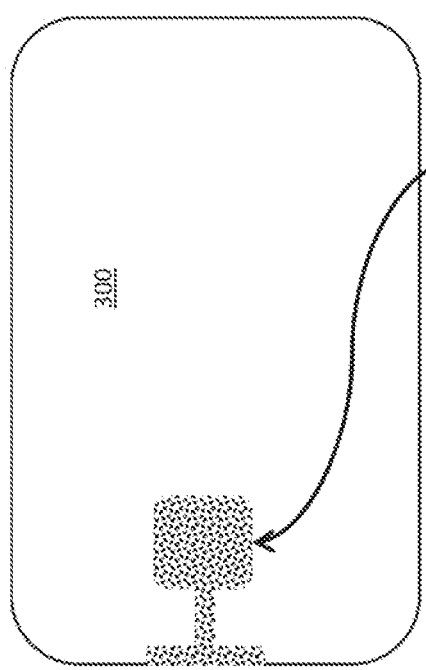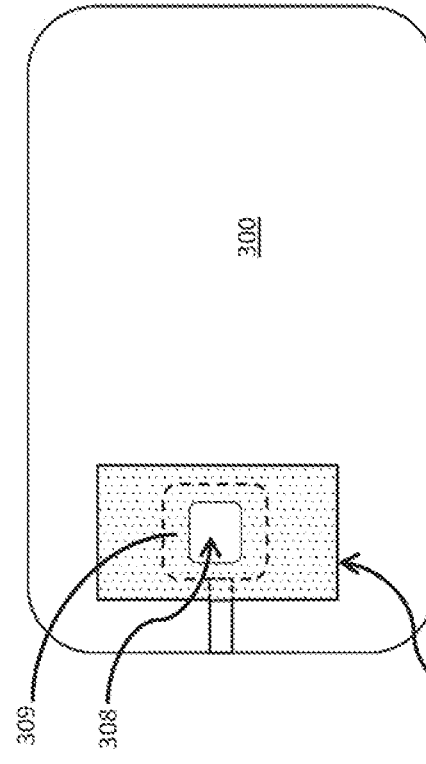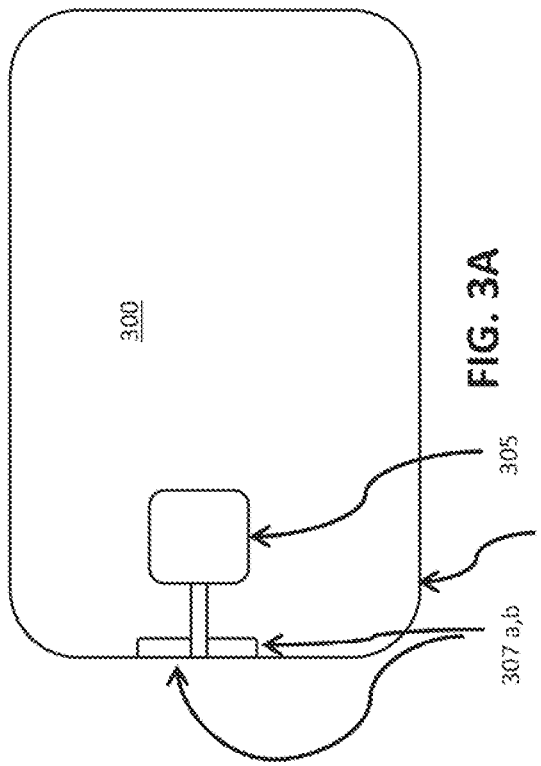
FIG. 3A
FIG. 3B
FIG. 3C
FIG. 3D

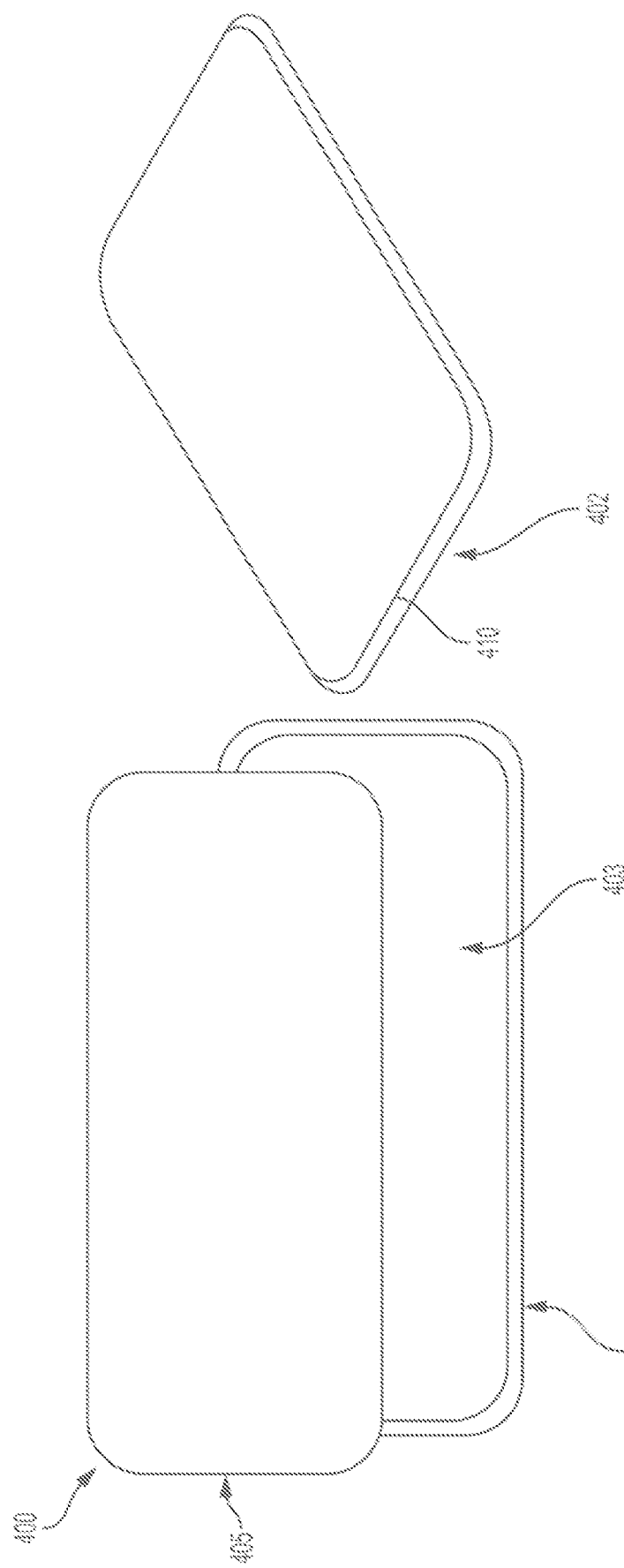

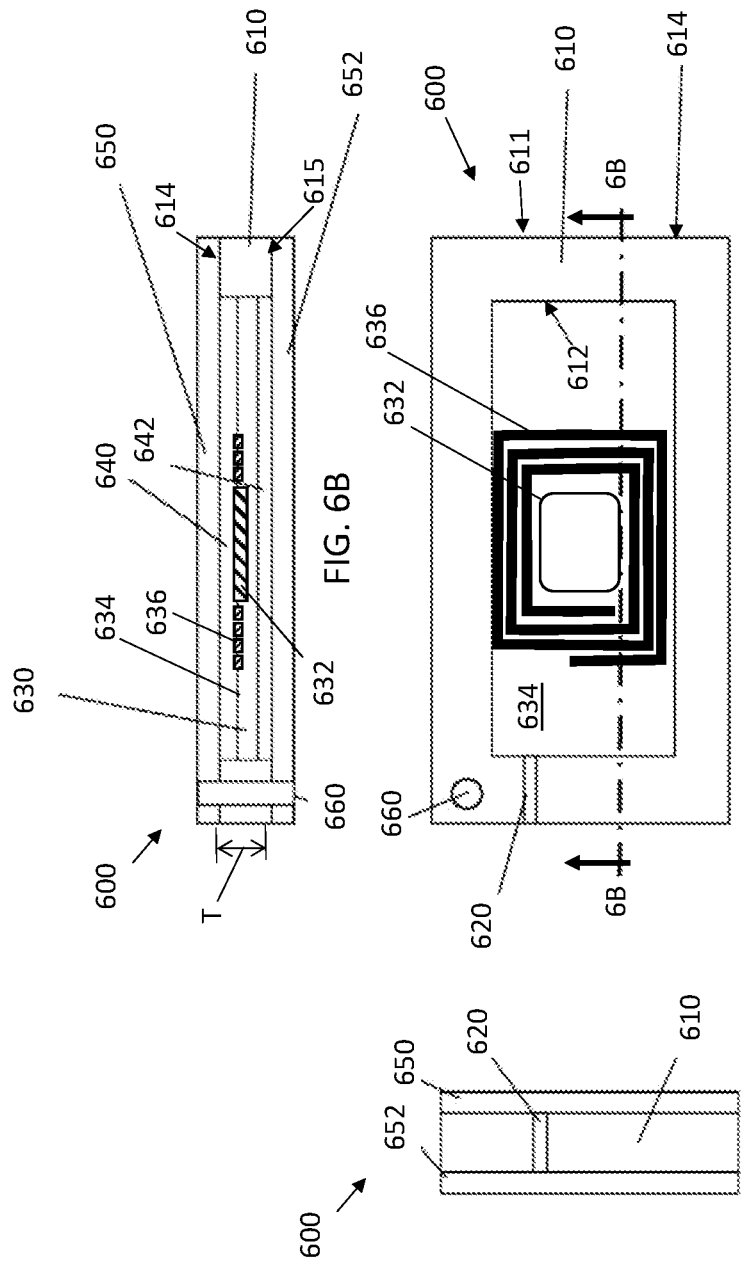

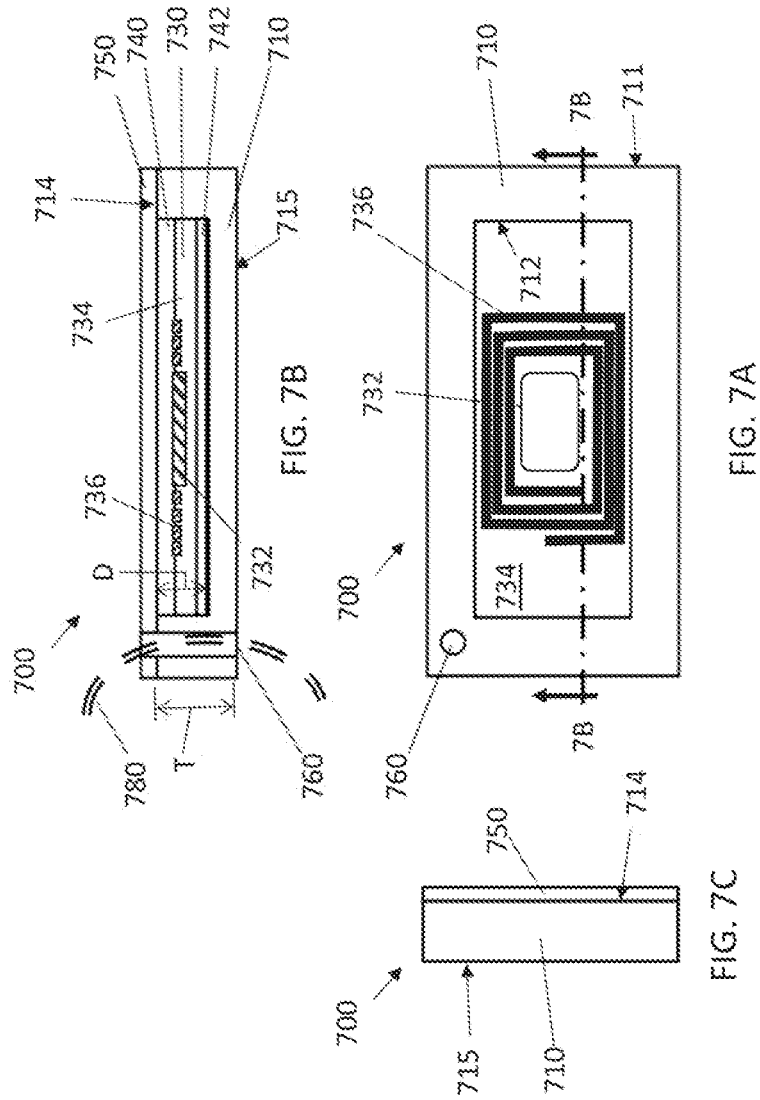

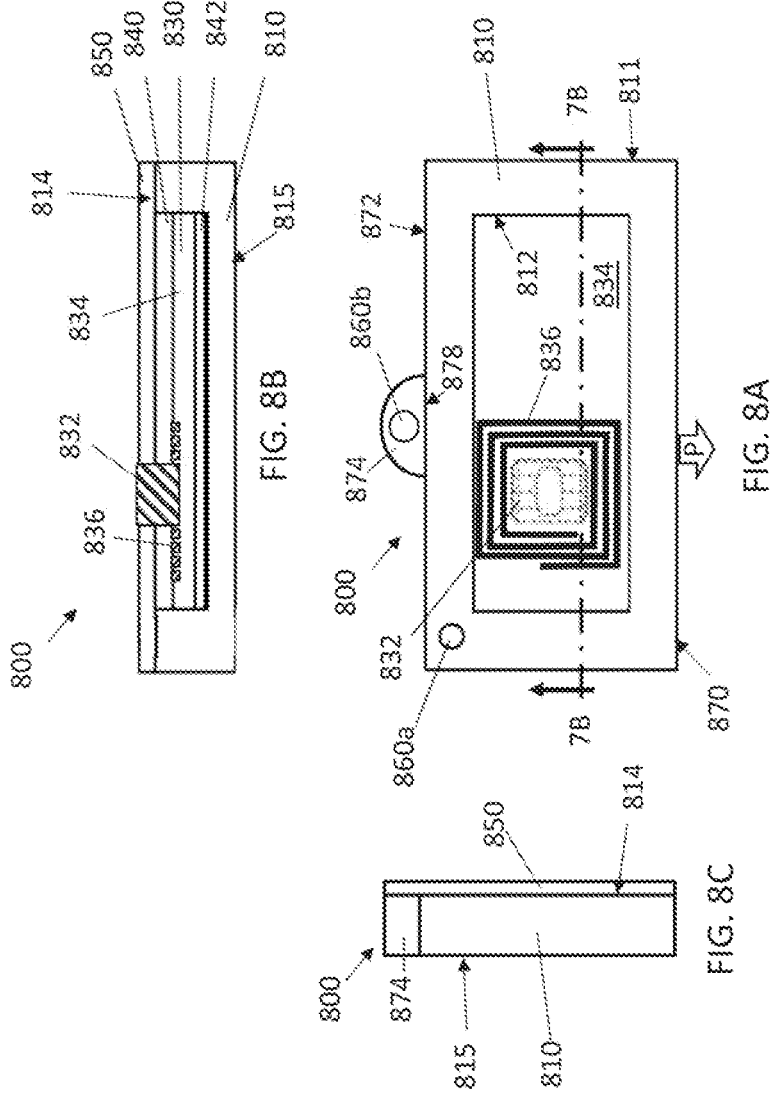

RFID DEVICE

This application is a continuation of U.S. application Ser. No. 17/128,427, filed Dec. 21, 2020 (status: allowed), which is a continuation of U.S. application Ser. No. 16/427,864, filed May 31, 2019, now U.S. Pat. No. 10,977,540, issued Apr. 13, 2021, which is a continuation-in-part (CIP) of U.S. application Ser. No. 16/320,597, filed 25 Jan. 2019, now U.S. Pat. No. 11,267,172 issued Mar. 8, 2022, which is a national phase application of PCT Application Ser. No. PCT/US2017/43954, filed 26 Jul. 2017, which claims priority to U.S. Provisional Application No. 62/367,362, filed 27 Jul. 2016, all of the foregoing titled OVERMOLDED ELECTRONIC COMPONENTS FOR TRANSACTION CARDS AND METHODS OF MAKING THEREOF. U.S. application Ser. No. 16/427,864 is also a continuation-in-part (CIP) of U.S. application Ser. No. 16/164,322, filed Oct. 18, 2018, now U.S. Pat. No. 10,406,734, issued Sep. 10, 2019, also titled OVERMOLDED ELECTRONIC COMPONENTS FOR TRANSACTION CARDS AND METHODS OF MAKING THEREOF, which itself is a continuation-in-part (CIP) of PCT Application Ser. No. PCT/US2017/43954. All of the foregoing are incorporated herein by reference in their entireties for all purposes.

FIELD OF THE INVENTION

This invention relates to transaction cards with electronic components and methods for producing the same.

BACKGROUND OF THE INVENTION

Metal transaction cards present unique challenges when including electronic components, such as inductive coupling IC chips, RF electronics, and standalone electronic inlays. To accommodate these components, the metal is machined into various geometries, and then the component is placed in the cavity and left exposed or hidden under a printed sheet of plastic or other decorative element. The decorative element may be affixed to the card through a variety of processes such as platen lamination, contact adhesive, curable adhesives, or "push fit" or any joining method known to the art. RF shielding is often required in the cavity, further complicating card assembly while maintaining the desired aesthetic of the card.

Some of these required machining geometries remove significant amounts of metal or leave slits or holes through the card, which weakens its strength and are undesirable aesthetically. In order to strengthen the card and provide a desirable surface, overmolding and insert molding techniques have been developed to encapsulate electronic inlays within the cards and strengthen the card geometries. Furthermore, this development has improved RF performance over existing designs because it enables more metal remove in critical RF transmission and receiving areas while maintaining structural rigidity and desired appearance.

SUMMARY OF THE INVENTION

Aspects of the invention relate to transaction cards, processes for manufacturing transaction cards, as well as transaction cards produced according to the disclosed methods.

In accordance with one aspect, the invention provides for a process for manufacturing a transaction card and a transaction card produced thereby. The process includes forming an opening in a card body of the transaction card for receiving an electronic component; inserting the electronic component into the opening; and molding a molding material about the electronic component.

In yet another aspect, the invention relates to an RFID device having a metal frame, an opening in the metal frame, and a RFID inlay disposed inside the opening. The RFID inlay comprises a substrate, an RFID transponder chip mounted to the substrate, and an inductive coupling antenna in the substrate connected to the RFID transponder chip. At least one fill layer may be disposed in the opening of the frame between the chip layer and one of the surfaces of the metal frame and at least one layer may be laminated over at least one surface of the metal frame.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawings, with like elements having the same reference numerals. When a plurality of similar elements is present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures:

FIG. 1 is a flow diagram of selected steps of a process for manufacturing a transaction card in accordance with aspects of the present invention.

FIG. 2A is a photograph depicting an electronic component before overmolding in accordance with aspects of the present invention.

FIG. 2B is a photograph depicting an electronic component after overmolding in accordance with aspects of the present invention.

FIG. 3A is a schematic illustration of the front of a transaction card prior to insertion molding in accordance with aspects of the present invention.

FIG. 3B is a schematic illustration of the rear of a transaction card prior to insertion molding in accordance with aspects of the present invention.

FIG. 3C is a schematic illustration of the front of a transaction card after to insertion molding in accordance with aspects of the present invention.

FIG. 3D is a schematic illustration of the rear of a transaction card after to insertion molding in accordance with aspects of the present invention.

FIGS. 4A and 4B are schematic illustrations of selected steps of an over molding process for manufacturing a transaction card in accordance with aspects of the present invention.

FIG. 6A is a schematic illustration plan view of an exemplary contactless RFID device in accordance with one aspect of the invention, prior to encapsulating a chip layer within the opening in the frame.

FIG. 6B is a schematic illustration view of an exemplary contactless RFID device of FIG. 6A in cross-section through line 6B-6B, after encapsulating the chip layer.

FIG. 6C is a schematic illustration end view of the exemplary contactless RFID device of FIG. 6B.

FIG. 7A is a schematic illustration plan view of an exemplary contactless RFID device in accordance with another aspect of the invention, prior to encapsulating a chip layer within the opening in the frame.

FIG. 7B is a schematic illustration view of the exemplary contactless RFID device of FIG. 7A in cross-section through line 7B-7B, after encapsulating the chip layer.

FIG. 7C is a schematic illustration end view of the exemplary contactless RFID device of FIG. 7B.

FIG. 8A is a schematic illustration plan view of an exemplary DI RFID device in accordance with another aspect of the invention, prior to encapsulating a chip layer within the opening in the frame.

FIG. 8B is a schematic illustration view of the exemplary DI RFID device of FIG. 8A in cross-section through line 8B-8B, after encapsulating the chip layer.

FIG. 8C is a schematic illustration end view of the exemplary contactless RFID device of FIG. 8B.

DETAILED DESCRIPTION OF THE INVENTION

Figure 5A:
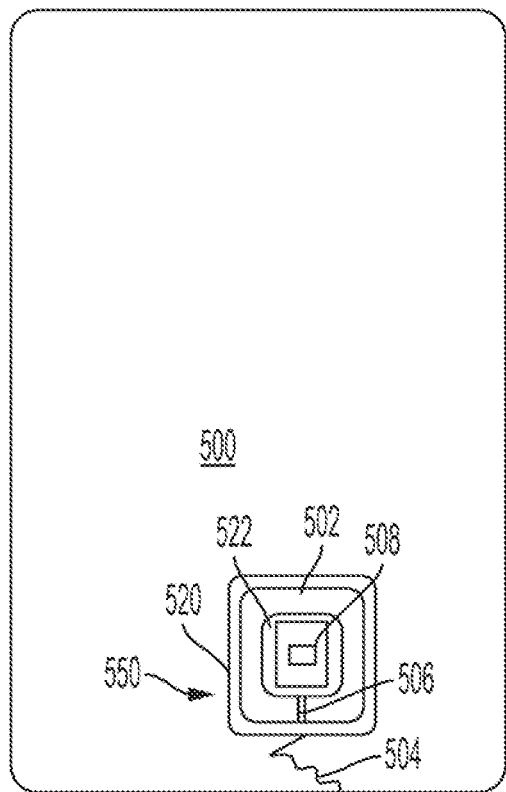
FIG. 5A is an image depicting the front side of an exemplary card having an encapsulated antenna surrounding the IC chip.

Aspects of the invention relate to transaction cards, processes for manufacturing transaction cards, as well as transaction cards produced according to the disclosed methods. The term "transaction" as used herein is intended to be very broad in scope, including any type of exchange of information between the card and a card reader. As used herein, the term "transaction card" is not limited only to standard credit card sizes, but may encompass devices of any geometry capable of use for performing transactions of the any type, including transaction types typically performed by credit cards, debit cards, ID cards, loyalty cards, transit cards, and the like. ID cards may include visual ID cards with a printed picture of the identified carrier as well as contactless proximity or transit wallets.

In FIG. 1, a flow diagram depicting selected steps of a process 100 for producing a transaction card according to aspects of the invention is shown. It should be noted that, with respect to the processes described herein, it will be understood from the description herein that one or more steps may be omitted and/or performed out of the described sequence of the process while still achieving the desired result.

In step 110, an opening is formed in the card body of the transaction card. The opening may be sized to accommodate one or more molded electronic components. The opening may extend partially (thereby forming, e.g., a pocket) or completely (thereby forming a hole) through the card body. In some embodiments, a hole formed through the card body may then be fully or partially covered on one side, such as with an applied material, such as an adhesively bonded plastic material, such as element 307c, shown in FIG. 3D. As depicted in FIG. 3D, element 307c overlaps an area surrounding the hole, to form a pocket bounded on the periphery by the edges of the hole in the card body and on a bottom end by the applied material 307c. The applied material may be a material that is the same or that is compatible with the molded material later to be filled in the pocket. In some embodiments, as shown in FIG. 3D, the applied material 307c overlapping the area surrounding the hole in the card body, may have a through-hole 308 having an area smaller than the hole in the card body, so as to provide a "ledge" 309 of applied material inside the periphery of the hole in the card body.

The card body of the present invention may be comprised of any suitable material including any suitable metal, such as stainless steel, bronze, copper, titanium, tungsten carbide, nickel, palladium, silver, gold, platinum, aluminum, or any alloy which gives the card most of its body (structure) and weight. Additionally, or alternatively, the card body described herein may be comprised of any suitable polymeric (e.g., polycarbonate, polyester) or inorganic (e.g., glass, ceramic) material, or any combination of any of the foregoing materials.

In step 120, an electronic component is inserted into the opening of the card body.

In step 130, a molding material is molded about the electronic component. It should be noted that the order of steps 120 and 130 may be varied depending on the particular application.

In one embodiment, step 130 includes an overmolding process. During the overmolding process, a molding material is molded about (and typically over) an electronic component such that the molding material covers at least a portion of a surface of the electronic component. Overmolding of electronic components may be accomplished using conventional and commercially available equipment, such as the ENGLE insert (Engel Austria GmbH, Austria) and the Cavist MoldMan™ (Reno, Nev.).

An electronic component 201 is shown before (in FIG. 2A) and after (in FIG. 2B) an overmolding process. While the overmolded component 200 is depicted as having molding material 205 completely covering electronic component 201, one of ordinary skill in the art will understand that varying degrees of overmolding can achieve the desired structural rigidity, functionality, and aesthetic of the transaction card. In particular, as shown in FIGS. 2A and 2B, electrical contacts, in the form of wires 210 and 220 connected to component 200, each have an unencapsulated end that protrudes from the overmolding to permit electrical connection to the component. It should be understood, that, although depicted as wires in FIGS. 2A and 2B, the electrical contacts or other unencapsulated portions not limited to electrical contacts, may take any shape or form. It should be further understood that in certain embodiments, such as embodiments in which a technically desirable degree of coupling between unencapsulated and encapsulated components can be made through the encapsulation layer, the component may be completely encapsulated.

Returning to FIG. 1, where an overmolding process is employed, step 130 may be performed prior to performing step 120. That is, the electronic component may be separately overmolded prior to insertion into the opening of the card body. Prior to the insertion of the overmolded electronic component, the overmolded component may be further machined to remove excess molding material and/or to create features in the molding material that may be used to secure the overmolded electronic component into the opening of the card body. For example, with reference to FIG. 2B, a lip may be machined into molding material 205 so that overmolded component 200 may be secured into the opening of a card body.

Alternatively, overmolding in step 130 may be performed after performing step 120. In this embodiment, the electronic component is inserted into the opening of the card body. Subsequently, molding material is forced to flow into the opening of the card body and form over one or more exposed surfaces, including at least the top surface, of the electronic component. One of ordinary skill in the art will understand that when molding material flows into the opening of the card body, the card body material may be selected to withstand the pressure and heat associated with overmolding without substantially deforming.

Where an insert molding process is employed, step 130 may be performed before performing step 120. Conventional insert molding processes include inserting the electronic component into a mold, followed by the injection of molding material into the mold cavity to form the molded electronic component. The molded electronic component may be fully or partially encapsulated by molding material following an insert molding process.

Turning to FIGS. 3A-D, schematic illustrations of selected steps of an insert molding process for manufacturing a transaction card in accordance with aspects of the present invention are depicted. In the figures, areas 305 and 308 in FIGS. 3A-3D represent holes through the cards. Area 307*a,b* in FIG. 3A and area 307*c* in FIGS. 3B and 3D represent partially covered holes (pockets) in the card body for the molding material to bind and find purchase. FIG. 3B depicts the completed molded card in which the insert molded material of molded component 310 is visible. Although the insert molded material is shown contrasting with the background card materials for purposes of illustration, the molded component is not limited to any particular degree of contrast in coloration or shading relative to the background card, and may comprise the same materials as the front of the card or may comprise materials selected to have a coloration or shading selected to match the coloration or shading of the front side of the card so as to minimize its visibility in a completed card. For example, in a card body comprising materials different than the molding materials (e.g. a metal or ceramic body and thermoplastic resin molding materials), the coloration of the molding materials may be selected have a color and tone that matches as closely as possible the material of the body, including using constituents in the molding materials that are the same or similar to the card body materials (e.g. inclusion of a powdered metal in the molding materials that is the same as the metal of the body). In other embodiments, molding materials that contrast with the body of the card may be used. FIG. 3A depicts the front side of a transaction card 300 including an opening 305 which extends entirely through a card body 302. A plurality of securing features 307*a, b* provide areas to which the molding material can adhere or otherwise bind. In the depicted embodiment, securing features 307*a,b* are blind holes (e.g., pockets). A similar set of securing features 307*c* are found on the opposing rear side of transaction card 300 in FIG. 3B. The geometries of opening 305 and securing features 307*a, b, c* were selected to improve the RF performance of the metal transaction card 300. Securing features 307*a, b, c* may comprise a material that is the same or otherwise compatible with the molding material, and different than the card body material, such that the molding material and the materials of the securing features melt or otherwise join together with a bond that is relatively stronger than any bond created between the molding material and the card body.

FIG. 3C depicts the front side of the transaction card 300 after an insert molded electronic component 310 has been placed into opening 305. In the depicted embodiment, molded electronic component 310 would be visible on transaction card 300. The geometry of molded electronic component 310 permits molded electronic component 310 to become secured to transaction card 300 through a biasing action created by securing features 307*a,b,c*. Alternatively, or additionally, molded electronic component 310 may be adhered to opening 305 of transaction card 300 using an epoxy resin such as Bisphenol, Novolac, Aliphatic, and Glycidylamine.

Excess molding material may be removed from molded electronic component 310 (by, e.g., milling or machining) to incorporate additional electronic components or other desired components.

FIG. 4A depicts an exemplary overmolding process in which a pocket 403 is machined into card body 402 for receiving an electronic component 405. In the depicted embodiment electronic component 405 is a printed circuit board (PCB), specifically an RFID module. While pocket 403 is depicted as traversing a substantial portion of the rear face of card body 402, one of ordinary skill in the art will understand the smaller openings of varying geometries may be suitable depending upon the electronic component to be incorporated.

Pocket 403 may be sized to receive and fix into position electronic component 405, or it may be sized to permit excess molding material between the inner lip of pocket 403 and the outer edge of electronic component 405. Electronic component 405 may additionally, or alternatively, be adhered to pocket 403 using an epoxy as described above.

Overmolded faceplate 410 creates the back face of transaction card 400. Overmolded faceplate 410 may completely or partially encapsulate electronic component 405. Overmolded faceplate 410 may be prepared separately and then attached to pocket 403 (using, e.g., a suitable epoxy as described above), or it may be formed by overmolding layers of molding material directly into pocket 403.

In an exemplary embodiment, the molding material used in overmolded faceplate is a plastic material that may enhance RF transmission where transaction card 400 is comprised of a metal or other RF-interfering material.

As is known in the art, transaction cards with RFID chip modules for inductively coupling with a card reader of a point of sale (POS) terminal also typically have an embedded booster antenna structure configured that inductively couples the embedded antenna to the RFID chip, with the coupled antenna, RFID chip, and card reader forming a circuit for transmitting information from the card to the card reader. Thus, in an exemplary embodiment in which the RFID module is the encapsulated or partially encapsulated component (or one of a plurality of electronic components that are processed as described herein), the antenna structure may be provided in any number of ways. In one embodiment, the antenna structure may be embedded in a layer that is applied to the card after the molding processes described herein. The antenna-bearing layer may be laminated to the card using a non-heat process (such as with an adhesive), a heat lamination process conducted at a temperature, pressure, and duration that does not re-melt, deform, or otherwise detrimentally disturb the molding over the electronic component(s), or a backing sheet (comprising metal or some other material not affected by the heat lamination) may be provided during such a heat lamination step to prevent any re-melt or deformation of the molding from protruding from the opposite surface upon which the lamination step is being performed.

In another embodiment, the molding step may comprise an overmolding step that covers not only the electronic component as described herein, but also at least the portion of the card surface into which the antenna structure is to be later disposed. For example, a flood overmolding step may be conducted that, in addition to encapsulating or partially encapsulating the RFID chip, also covers at least one entire surface (typically back, but also or instead may be the front) of the card in a layer having a desired thickness. The antenna may then be embedded, such as using ultrasonic processes known in the art, into that overmolded layer. Any content to be printed on the surface of the card may also be printed on the overmolded layer surface, or an additional printing layer may be attached, such as via adhesive or lamination. In other embodiments, the antenna may be printed on the molding surface, or applied as part of another layer that is attached over the molded surface, such as with adhesive or by lamination. The foregoing are non-limiting examples, and it should be understood that infinite possibilities exist for downstream processing of the resulting product of the processes described herein for providing a molded electronic component in a card, and certain aspects of the invention are not limited in any way by later process steps.

Figure 5B:
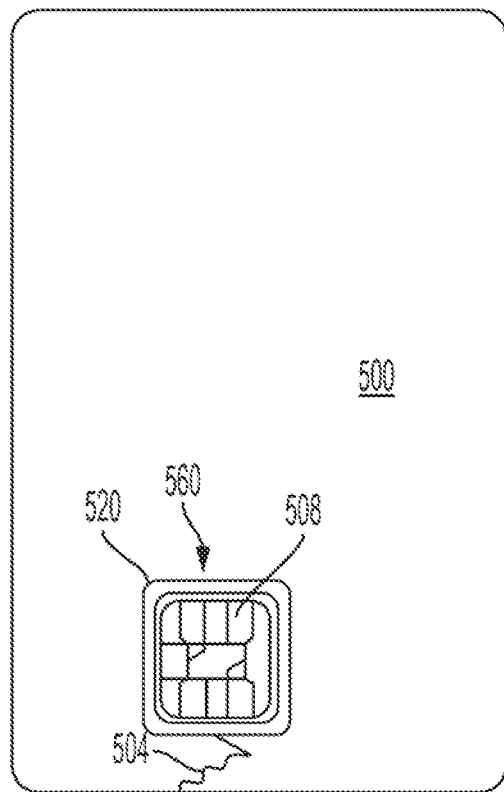
FIG. 5B is an image depicting the back side of the exemplary card of FIG. 5A.
Figure 5C:
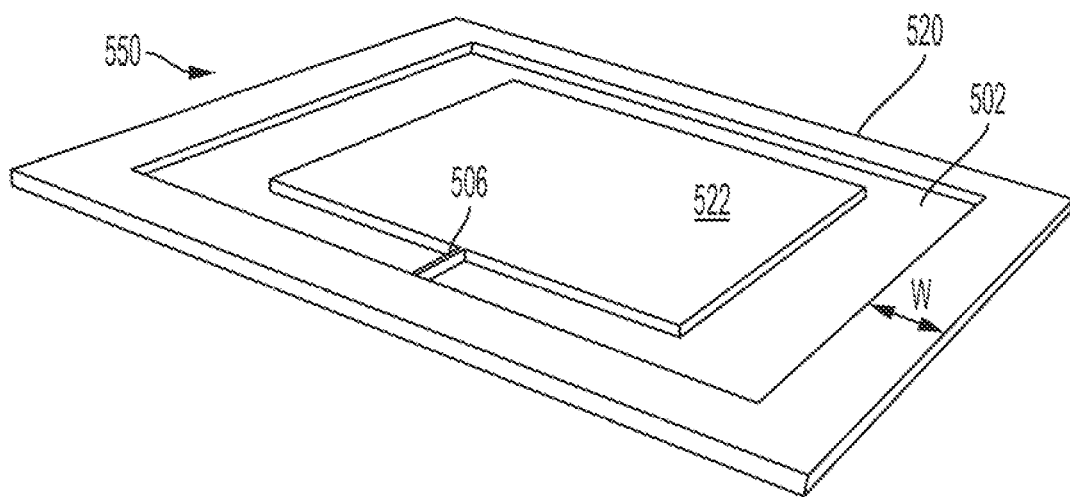
FIG. 5C is a perspective view of an isolated exemplary encapsulated antenna prior to insertion of the IC chip therein.

In another embodiment, illustrated in FIGS. 5A-5C, a booster antenna 502 for inductively coupling with the antenna of a RFID chip may take the form of an annular metal frame that nearly surrounds the RFID chip (e.g. a dual interface (DI) RFID chip). As depicted in FIGS. 5A-5C, the antenna has a discontinuity or slit 506 that extends from an inner edge to an outer edge of the annular antenna. Such an antenna has been generally described and characterized as an "amplifier" in U.S. Pat. No. 8,608,082 ('082 Patent) to Le Garrec et al. and a "coupling frame" in U.S. Pat. No. 9,812,782 (and others), to Finn et al., incorporated herein by reference. As described in the foregoing, and in U.S. patent application Ser. No. 15/928,813, filed Mar. 22, 2018, titled DI CAPACITIVE EMBEDDED METAL CARD, assigned to the common assignee of the present invention, and incorporated herein by reference, a metal card body itself may serve as such an antenna or amplifier, with a slit (e.g. 504, as depicted in FIGS. 5A and 5B) extending from the periphery of the card to the pocket in which the RFID chip is mounted. The slit may have any geometry, including but not limited to the stepped shape depicted in FIGS. 5A and 5B, any geometry described in the '813 Application and related applications, or any geometry disclosed in the foregoing references.

As shown in FIG. 5C, metal antenna 502 is surrounded by the encapsulating materials to form an outer surround 520 and an inner region 522, and the encapsulant also fills the slit 506 connecting the inner region to the outer surround. For illustrative purposes, the antenna is depicted in FIG. 5C without encapsulating materials covering it in the Z direction, so that the antenna remains visible in the depiction. In embodiments in which a metal body 500 of the card also is harnessed for signal amplification, the encapsulating material may also fills the slit 504 in the metal body. It should be understood, however, that slit 504 may not be present in all embodiments. It should further be understood that the card body may have more than one slit. Exemplary alternative additional slit locations 554, 564, 574 are depicted in dashed lines. For example, in one embodiment, the combination of slits 504 and 554 intersecting with the chip pocket may form a bisection along the full length of the card, or the combination of slits 564 and 574 intersecting with the chip pocket may together form a bisection along the full width of the card. It should be noted here that the term "bisect" is intended to mean that the line divides the card into two sections, but those sections are not necessarily equal in size. Although depicted generally centered on the antenna aligned to the same line on opposite sides of the antenna, the combined slits may have any relationship to the antenna and to each other, including a relationship wherein the slits on different sides of the antenna lie on parallel or non-parallel lines, relationships in which the slits connect to adjacent rather than opposite sides of the antenna, relationships wherein the slits are not parallel to an edge of the card, or relationships wherein one or both of the slits are non-linear. For embodiments in which the card is bisected, the remaining pieces of the card may be bonded together by overmolding or other nonconductive adhesives or fillers. Although a preferred embodiment includes only a single bisection of the card body into two discrete portions, a plurality of body slits may divide the card into more than two discrete portions. Bisected arrangements, generally, may minimize eddy currents.

Thus, antenna 502 as encapsulated as depicted in FIG. 5C defines a metal containing plug 550, which may either be created in its entirety and then inserted in an opening in the card body, or may be created in situ in the opening in the card body, such as by overmolding. After the plug is inserted in the pocket or molded in situ, a pocket may be created in the inner region 522 of the plug (e.g. by milling or any process known in the art) to receive the RFID chip. Among the advantages of such a design is that the metal card body may be formed with a through hole for receiving plug 550. Preferably, the through-hole may be formed by methods other than milling, such as stamping, etching, laser cutting, or the like. Or, the card body may be formed initially with a through-hole, which may be particularly advantageous for a card body that is ceramic, cast metal, or metal-doped epoxy (such as is described in U.S. Provisional Application Ser. No. 67/730,282, filed Sep. 12, 2018, titled METAL-DOPED EPOXY RESIN TRANSACTION CARD AND PROCESS FOR MANUFACTURE, assigned to the common assignee of the present application, and incorporated herein by reference). Then, the milling step to create the pocket to receive the RFID chip need only be performed in a non-metal encapsulating material, which is easier and takes less time to mill than metal. As is known in the art, the pocket for receiving the RFID chip may be a stepped hole having a first, relatively greater area on the front surface of the card, and a second, relatively lesser area on the back side of the card. By enlarging the area of the pocket in the card body into which the RFID chip is inserted, the overall length of the slit 504 that must be cut into the metal card body (in embodiments in which the slit is present), can be minimized, also saving manufacturing time. The foregoing improvements foster increased output and efficiency.

In some embodiments, it may not be necessary or desired for the card body to serve as part of the booster antenna. In such embodiments, the opening in the card body may be relatively larger than as depicted in FIGS. 5A-5C, such that outer surround 520 has a width W separating the metal of the antenna 502 in the plug 550 from the card body that is operable to acceptably minimize electrical/magnetic interference from the card body. The geometry of the plug 550 in such embodiments may be more rectangular, with the innermost edge 560 of the plug positioned more towards the center of the card body 500 to guide some of the RF signal towards the center of the card, while the location of the DI RFID chip remains essentially unchanged as depicted, to conform to the relevant standard for the position of the contacts.

Although described herein in connection with a metal card body, similar geometries may be employed in non-metal cards. In addition to the methods of manufacture described herein, which are suitable for card bodies of any materials (although particularly advantageous for metal, ceramic, and ceramic-coated-metal bodies), antenna 502 may be deployed in a plastic (e.g. PVC) card body, for example, by ultrasonically (or otherwise) embedding the metal component into the plastic as an inlay within the card, thus replacing copper wire or etched antenna inlays. The antenna geometry 502 as depicted can be described as a planar, annular member having a nearly closed periphery, with a slit 506 that connects the inner periphery with the outer periphery of the annulus. Although depicted in the exemplary embodiment as a single member, the antenna structure is not so limited and may comprise more than one member. By contrast, copper wire or etched antenna inlays typically create a spiral pattern of lines or wires with spaces radially separating the whorls of the spiral.

One of ordinary skill in the art will understand that suitable molding materials will depend upon the type of molding process used in step 130. For example, where insert or overmolding is employed, thermoplastic materials such as TechnoMelt® meltable adhesive (Henkel), which may include one or more materials from the group consisting of: EVA, metallocene polyalphaolefins, polyolefins including atactic polyalphaolefins, block copolymers, polyurethane hot melts, and polyamides and thermoset materials such as fiberglass reinforced polyester, polyurethane, Bakelite® synthetic resin, Duroplast, melamine, Diallyl-phthalate, and polyimide may be used. One of ordinary skill in the art will understand that other materials which can be rendered flowable in an overmolding or insert molding process may be used as well including, but not limited to, powdered metals such as Rhodium, Aluminum, Titanium, Magnesium, Copper, Brass, Nickel, Monel, Inconel, Steels and alloys of the above.

In another embodiment, the molding material used in the overmolding or insert molding process is a plastic material having a molding temperature range of approximately 150-300 C.

FIGS. 6A-6C depict a particular embodiment 600 of a metal RFID device comprising a body in the form of metal frame 610 having an outer periphery 611, an opening in the card body that defines an inner periphery 612 of the metal frame. At least one body discontinuity 620 extends from the outer periphery to the inner periphery of the metal frame. At least one electronic component is disposed in the opening and layers of non-conductive material 640, 642 are disposed about the electronic component. The electronic component comprises an RFID chip 632 disposed in a substrate 634 with an antenna 636, also disposed in the substrate, connected to the RFID chip. Collectively, the RFID chip, antenna, and substrate may be referred to as an RFID module. Thus, RFID device 600 comprises a metal frame 610 having opposite surfaces 614, 615, outer periphery 611 and an opening in the metal frame defining inner periphery 612 and extending from at least one of the opposite surfaces 614, 615 for a depth. As depicted in FIG. 6A-6C, the opening has a depth coexistence with a thickness T of the metal frame from upper surface 614 to lower surface 615. Chip layer 630—comprising a non-conductive substrate 634, RFID transponder chip 632 mounted to substrate 634, and module antenna 636 in the substrate connected to the RFID transponder chip—is disposed inside the opening. The module antenna may be etched or may have any construction known in the art for being disposed in the substrate. One or more fill layers 640, 642 may be disposed in the opening of the frame between the chip layer and one of the surfaces of the metal frame. One or more layers 650, 652 may be laminated over at least one surface of the metal frame. A through-hole 660 extending between the top and bottom surfaces of the device, as depicted in FIG. 6B between the top surface of the top layer 650 and the bottom surface of the bottom layer 652, preferably aligned over a portion of the device located between the inner 611 and outer surfaces 612 of the metal layer. Although shown in FIGS. 6A-6C with both antenna 636 in the chip layer and discontinuity 620 in the metal frame, it should be understood that some components may have only one or the other, but not both, whereas other embodiments may have both, as depicted.

One process of making device 600 may comprise affixing layer 652 to the bottom surface 615 of the metal frame 610 prior to stacking layers 642, 630 and 640 in the opening, and then disposing layer 650 over the opening, and laminating the stack such that layers 640 and 642 envelop chip layer 630. The metal frame may be constructed by cutting the opening in a metal blank, by molding the metal in the desired shape, or by make slicing cross sections from an extruded bar. Although depicted as having dimensions that extend to the inner periphery 612 of metal frame 610, it should be understood that chip layer 630 may have a substantially smaller footprint, such that layers 640 and 642 completely envelop all sides of chip layer 630. Furthermore, it should be understood that an intermediate layer (not shown) of non-conductive material may be disposed between layers 640 and 642, with a cutout for accommodating the periphery of substrate 634, in constructions in which the outer periphery of substrate 634 is less than the inner periphery 612 of the frame.

In another embodiment, depicted in FIGS. 7A-7C, RFID device 700 comprises a metal frame 710 having opposite surfaces 714, 715, outer periphery 711 and an opening in the metal frame defining inner periphery 712 and extending from surfaces 714 for a depth D. As depicted in FIG. 7A-7C, the opening has a depth D that is less than the thickness T of the metal frame from upper surface 714 to lower surface 715. Chip layer 730—comprising substrate 734, RFID transponder chip 732 mounted to substrate 734, and module antenna 736 in the substrate connected to the RFID transponder chip—is disposed inside the opening. Thus, the opening comprises a pocket having a bottom and a ferrite layer 742 disposed between the chip layer and the pocket bottom and fill layer 740 is disposed in the pocket between the chip layer 730 and the top surface 714 of the metal frame. Layer 750 is laminated over top surface 714 of metal frame 710 and over fill layer 740.

One process of making device 700 may comprise making the pocket opening in a metal blank (by milling, etching, laser) to define metal frame 710, stacking layers 742, 730 and 740 in the opening, disposing layer 750 over the opening, and laminating the stacked components together. As depicted in FIGS. 7A-7C, RFID device 700 has a through-hole 760 extending between the top and bottom surfaces of the device, between the top surface of the top layer 750 and the bottom 715 surface of the metal layer as depicted in FIG. 7A, preferably aligned in the portion of the device between the inner 711 and outer surfaces 712 of the metal layer. As further depicted in FIG. 7B (not shown in FIG. 7A or 7C to reduce clutter, and also applicable to the designs of FIGS. 6A-6C and FIGS. 8A-8C, but not shown), hole 760 may be particularly well suited to receive a member 780, such as a component of an apparatus configured to hold one or more keys, such as a key ring or a key chain. Thus, devices 600 and 700 may be a smaller size than that typically associated with a credit card, and more befitting of a size suitable to serve as a key fob or key tag.

While FIGS. 6A-6C and 7A-7C depict contactless-only RFID devices, it should be understood, that the RFID device in any of the foregoing may be a dual interface device capable of interfacing with both contactless and contact-based readers. Thus, as depicted in in FIGS. 8A-8C, RFID device 800 comprises a metal frame 810 having opposite surfaces 814, 815, outer periphery 811 and an opening in the metal frame defining inner periphery 812 and extending from surface 814 for a depth. Chip layer 830—comprising substrate 834, RFID transponder chip 832 mounted to substrate 834, and module antenna 836 in the substrate connected to the RFID transponder chip—is disposed inside the opening. In the embodiment depicted in FIG. 8B in which the opening comprises a pocket having a bottom, a ferrite layer 842 is disposed between the chip layer and the pocket bottom, with fill layer 840 disposed in the pocket between the chip layer 830 and the top surface 814 of the metal frame. Layer 850 is laminated over top surface 814 of metal frame 810 and over fill layer 840. DI chip, because it has contact-based functionality, extends to the top surface of upper layer 850.

One process of making device 800 may comprise making the pocket opening in a metal blank (by milling, etching, laser) to define metal frame 810, stacking layers 842, 830 and 840 (having a cutout to accommodate chip 832) in the opening, disposing layer 850 (with a cutout to accommodate chip 832) over the opening, and laminating the stacked components together. In another embodiment, only antenna 836 may be present on substrate 830 when the stack of layers 842, 830, 840 and 850 are laminated together, and then a hole for receiving chip 832 is created and chip 832 is inserted. A subsequent lamination step may be performed at a temperature suitable to reflow the meltable layers to encapsulate all but the top contact surface of chip 832.

Although depicted as a pocket with a depth less than the thickness of the metal frame in FIG. 8B, it should be understood that DI chip (or contact only) designs may also be suitable for use with designs in which the opening extends the full thickness of the metal frame, such as the embodiment depicted in FIGS. 6A-6C. Furthermore, permutations of such embodiments include those with only an antenna 836, those with an antenna 836 and a slit similar to slit 620, and those with both an antenna and a slit.

To maintain functionality in standard card-readers meant for credit-card sized payment devices, the orientation (with short edge of the contact pad of chip 832 parallel to leading edge 870 of the device) of DI chip, location (left of center) of DI chip 832, and the dimensions of metal frame 810, are identical to that of the left-most portion of a standard DI credit card (viewed from the front or top surface of the card). Such a construction permits the device to be inserted in the direction of arrow P into a contact-based card reader, oriented leading edge 870 first, making device 800 indistinguishable from a standard credit card from the perspective of the card reader.

While none of the embodiments 600, 700, 800 are limited to any particular location for the through-hole for accommodating a component of a key carrier, it should be understood that in DI (or contact-only) devices, the hole should be located where it does not cause interference with insertion in the card reader. While a location in the upper left or upper right hand corners of the device (e.g. where hole 860a is shown in FIG. 8A), may be acceptable, the overall dimensions of the device in the card insertion direction may be reduced in constructions in which the hole is located on an appendage 874 that protrudes from the trailing edge 872 of the card, such as in the location where hole 860b is depicted in FIG. 8A. Although semicircular in geometry as depicted in FIG. 8A, appendage 874 may have any geometry desired.

While only a single through-hole may be needed per device, some devices may have more than one. Although depicted with through-holes 660, 760, 860a, 860b in particular locations in the drawings, the hole may be in any location that does not interfere with the functional elements of the device (or intended uses of the device, e.g., for use in a card reader, for contact inclusive modules). Locations in the metal corners of the frame, however, may be particular desirable.

Although depicted as rectangular, it should be understood that devices 600, 700, 800 may have any geometry desired (most particularly device 600 and 700 not depicted with contact function). Although device 800 requires a geometry for insertion in a card reader in relevant portions, its overall geometry is not limited.

Although described herein in specific embodiments comprising an opening and non-conductive laminated layers and/or substrate surrounding the RFID transceiver chip, it should be understood that the RFID chip and/or the antenna may be encapsulated using any of the techniques described herein. Furthermore, although the discussion of some embodiments herein refer to "cards" and others refer to "devices" suitable for use on a key holder, it should be understood that any of the designs as disclosed herein may be suitable for use in any size, not limited to either standard transaction card size or to smaller sizes intended for attachment to a key holder. As is known in the art, a standard transaction card (e.g. credit, debit, gift cards) conforms to the CR80 or ISO/IEC 7810:2003 standards, and has nominal dimensions of approximately 3.5 inches by 2 inches, or more specifically 3.37 inches (85.6 mm) by 2.125 (53.98 mm), 0.03125 inches (0.76 millimeters) thick, with rounded corners having a radius of 3.18 millimeters. As is understood by those in the art, the foregoing dimensions are nominal dimensions having a tolerance range for each. Although referred to herein as a "key holder," it should be understood that the devices with through-holes as discussed herein may be attached to any type of member suitable for passing through the hole, with or without keys attached to that same member, including chains, rings, lanyards, ropes, necklaces, bracelets, posts, etc.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A process for manufacturing a transaction device comprising the steps of:
    forming a metal frame defining an outer periphery, an inner periphery defined by an opening, and at least one body discontinuity from the outer periphery to the inner periphery of the metal frame;
    inserting at least one layer having a cutout into the opening;
    inserting at least one electronic component into the opening; and
    disposing a non-conductive material about the electronic component;
    wherein the opening comprises a blind hole.

2. The process of claim 1, wherein the step of disposing the non-conductive material about the at least one electronic component comprises disposing the non-conductive material onto at least a top surface of the at least one electronic component.

3. The process of claim 1, wherein the electronic component comprises an RFID module, the RFID module comprising an antenna connected to or configured to inductively couple to an RFID chip.

4. The process of claim 1, further comprising disposing at least one additional layer over the non-conductive material.

5. The process of claim 4, wherein the at least one additional layer is a printing layer.

6. The process of claim 4, wherein the step of disposing the at least one additional layer over the non-conductive material comprises adhesively attaching the one additional layer or laminating the at least one additional layer over the non-conductive material.

7. A transaction device comprising a molded electronic component of claim 1.

8. A transaction device manufactured according to the process of claim 1.

9. The process of claim 1, further comprising a step of laminating at least one additional layer over or under the at least one layer having the cutout, such that all but a top surface of the electronic component is encapsulated by the non-conductive material.

10. The process of claim 1, further comprising laminating at least one additional layer over or under the at least one layer and forming a cutout in the at least one additional layer.

11. The process of claim 10, wherein the steps of forming a cutout in the at least one additional layer and inserting at least one electronic component into the cutout both occur after the laminating step.

12. The process of claim 1, wherein the electronic component is a printed circuit board (PCB).

13. A transaction device, comprising:
a metal frame defining an outer periphery, an inner periphery defined by an opening in the metal frame, and at least one body discontinuity from the outer periphery to the inner periphery of the metal frame;
at least one layer having a cutout disposed in the opening;
at least one electronic component in the opening; and
a non-conductive material disposed about the electronic component;
wherein the opening comprises a blind hole.

14. The transaction device of claim 13, wherein the non-conductive material is disposed on at least a top surface of the at least one electronic component.

15. The transaction device of claim 13, the electronic component comprising an RFID transponder chip and a module antenna connected to or configured to inductively couple to the RFID transponder chip module.

16. The transaction device of claim 15, wherein the RFID transponder chip and the module antenna are disposed in a substrate.

17. The transaction device of claim 13, further comprising at least one layer laminated over at least one surface of the metal frame.

18. The transaction device of claim 13, wherein the electronic component is a PCB.

19. An RFID device comprising:
a metal frame having first and second opposite surfaces, an outer periphery, and an opening in the metal frame defining an inner periphery and extending from at least one of the opposite surfaces for a depth;
a chip layer disposed inside the opening;
at least one fill layer disposed in the opening of the frame between the chip layer and one of the surfaces of the metal frame;
at least one layer laminated over at least one surface of the metal frame; and
a hole extending between the first and second opposite surfaces;
wherein the depth of the opening is coextensive with the thickness of the metal frame and the metal frame comprises a discontinuity in the form of a discontinuity extending between the first and second opposite surfaces and outer and inner peripheries, the device further comprising first and second fill layers on opposite sides of the chip layer and first and second layers laminated over the opposite surfaces of the metal frame and the respective first and second fill layers.

20. The RFID device of claim 19, wherein the device has only a single laminated layer extending over the first surface of the metal frame and the fill layer.

21. The RFID device of claim 19, wherein the hole is disposed between the inner and outer peripheries.

22. The RFID device of claim 21, wherein the device comprises a component of a key ring or key chain, further comprising a member disposed in the hole, the member comprising a component of an apparatus configured to hold one or more keys.

23. The RFID device of claim 19, wherein the chip layer comprises a substrate, an RFID transponder chip mounted to the substrate, and a module antenna in the substrate connected to the RFID transponder chip.

24. The RFID device of claim 23, wherein the RFID transponder chip comprises a dual interface chip having a contact pad, and the contact pad is accessible from an outer surface of the device.

25. The RFID device of claim 19, wherein the RFID transponder chip is completely surrounded by non-conductive material.

26. The RFID device of claim 25, wherein the RFID transponder chip is embedded in a non-conductive substrate, and has a laminated fill layer in contact with at least one surface of the RFID transponder chip embedded in the non-conductive substrate.

27. The RFID device of claim 26, wherein the laminated fill layer comprises a ferrite layer in contact both upper and lower surfaces of the RFID transponder chip embedded in the non-conductive substrate.

28. The RFID device of claim 26, comprising the laminated fill layer in contact with only one surface of the RFID transponder chip embedded in the non-conductive substrate, and a ferrite layer in contact with an opposite surface of the RFID transponder chip embedded in the non-conductive substrate.

29. A process for manufacturing the transaction device comprising the steps of:
forming a metal frame defining an outer periphery, an inner periphery defined by an opening, and at least one body discontinuity from the outer periphery to the inner periphery of the metal frame;
inserting at least one electronic component into the opening, the electronic component being a PCB;
disposing a non-conductive material about the electronic component; and
disposing at least one additional layer over the non-conductive material,
wherein the opening extends entirely through the card body, and the at least one additional layer comprises a first additional layer disposed on one side of the opening before inserting the at least one electrical component, and the step of disposing the non-conductive material about the at least one electronic component comprises disposing a first layer of non-conductive material in the opening between the at least one additional layer and the at least one electronic component and disposing a second layer of non-conductive material on top of the at least one electronic component.

* * * * *